United States Patent
McKitterick

(10) Patent No.: US 7,302,359 B2
(45) Date of Patent: Nov. 27, 2007

(54) MAPPING SYSTEMS AND METHODS

(75) Inventor: John B. McKitterick, Columbia, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/350,302

(22) Filed: Feb. 8, 2006

(65) Prior Publication Data

US 2007/0185681 A1   Aug. 9, 2007

(51) Int. Cl.
*G01B 7/00* (2006.01)
(52) U.S. Cl. .............. 702/155; 701/207; 340/990; 348/169
(58) Field of Classification Search ........ 702/155; 340/990; 701/207, 208, 209, 300; 342/179; 348/169; 382/151, 152, 154, 156; 180/116, 180/167–169; 318/580, 587
See application file for complete search history.

(56) References Cited

U.S. PATENT DOCUMENTS

| | | | |
|---|---|---|---|
| 5,337,149 A | | 8/1994 | Kozah et al. |
| 5,852,672 A | * | 12/1998 | Lu .......................... 382/154 |
| 6,292,215 B1 | * | 9/2001 | Vincent ................... 348/169 |
| 6,349,249 B1 | * | 2/2002 | Cunningham ............. 701/28 |
| 6,442,476 B1 | * | 8/2002 | Poropat ................... 701/207 |
| 6,590,526 B1 | * | 7/2003 | Grube et al. ......... 342/357.07 |
| 6,616,244 B2 | * | 9/2003 | Hakkinen ................. 299/1.05 |
| 6,683,694 B2 | | 1/2004 | Cornil |
| 6,812,886 B2 | * | 11/2004 | Garren .................... 342/179 |
| 7,050,102 B1 | * | 5/2006 | Vincent ................ 348/333.02 |
| 7,173,562 B2 | * | 2/2007 | Garren .................... 342/179 |
| 2002/0049530 A1 | * | 4/2002 | Poropat ................... 701/207 |
| 2002/0072881 A1 | | 6/2002 | Saitta |
| 2002/0130953 A1 | * | 9/2002 | Riconda et al. .......... 348/115 |
| 2002/0198472 A1 | * | 12/2002 | Kramer .................... 600/595 |
| 2004/0122628 A1 | * | 6/2004 | Laurie ........................ 703/1 |
| 2005/0128212 A1 | * | 6/2005 | Edecker et al. .......... 345/582 |
| 2006/0001739 A1 | * | 1/2006 | Babayoff ................... 348/49 |
| 2006/0055584 A1 | * | 3/2006 | Waite et al. ............... 342/22 |
| 2007/0009078 A1 | * | 1/2007 | Saito et al. .................. 378/4 |

OTHER PUBLICATIONS

Chou et al., "Simultaneous Map-Plotting and Localization Method for Unknown Driving Environment", "Proceedings of the 2004 IEEE International Conference on Networking, Sensing and Control", 2004, pp. 886-890, vol. 2, Publisher: IEEE, Published in: Piscataway, NJ.

(Continued)

*Primary Examiner*—Carol S. W. Tsai
(74) *Attorney, Agent, or Firm*—Fogg & Powers LLC

(57) ABSTRACT

Improved systems and methods for mapping are provided. In one embodiment, a system for mapping is provided. The system comprises a rangefinder adapted to output range measurements; an inertial sensor adapted to capture inertial measurements including inertial forces acting on the rangefinder and the attitude of the rangefinder; and a processor coupled the rangefinder and the inertial sensor and adapted to receive a set of range measurements from the rangefinder and inertial measurements from the inertial sensor. The processor is adapted to produce a virtual room reconstruction based on the set of range measurements from the rangefinder and inertial measurements from inertial sensor.

12 Claims, 5 Drawing Sheets

OTHER PUBLICATIONS

Diosi et al., "Laser Scan Matching in Polar Coordinates With Application to Slam", "2005 IEEE/RSJ International Conference on Intelligent Robots and Systems", 2005, pp. 3317-3322, Publisher: IEEE, Published in: Piscataway, NJ.

Lu et al., "Globally Consistent Range Scan Alignment for Environment Mapping", "Autonomous Robots", 1997, pp. 333-349, vol. 4, No. 4, Publisher: Kluwer Academic Publishers, Published in: The Netherlands.

Reina et al., "A Two-Stage Mobile Robot Localization Method by Overlapping Segment-Based Maps", "Robotics and Autonomous Systems", 2000, pp. 213-225, vol. 31, No. 4, Publisher: Elsevier Science B.V., Published in: The Netherlands.

* cited by examiner

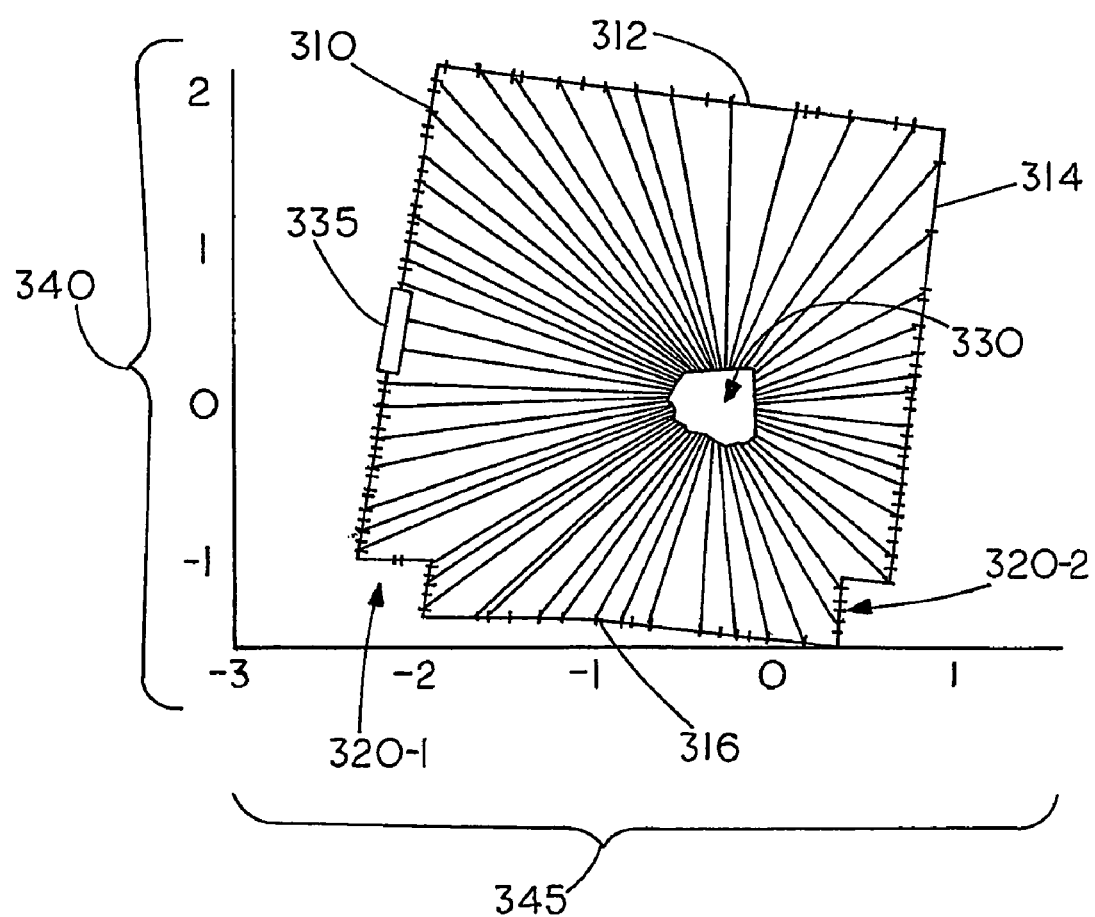

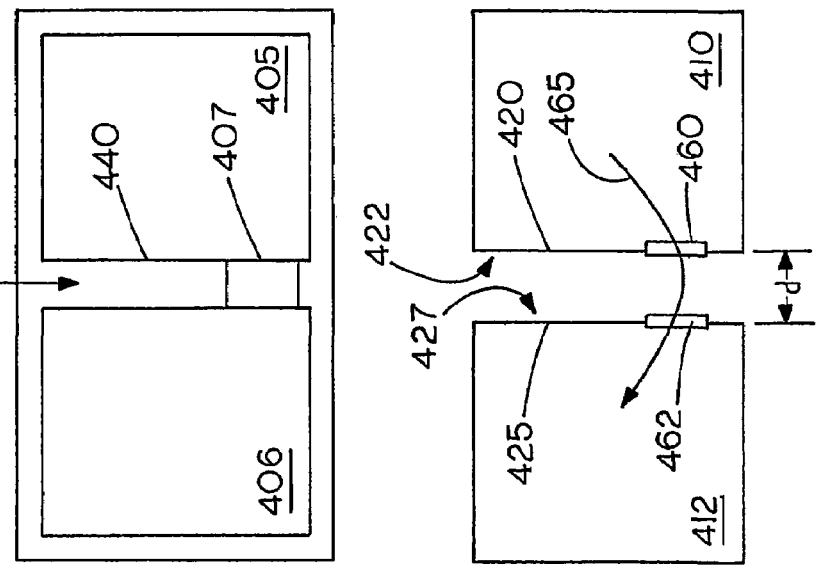
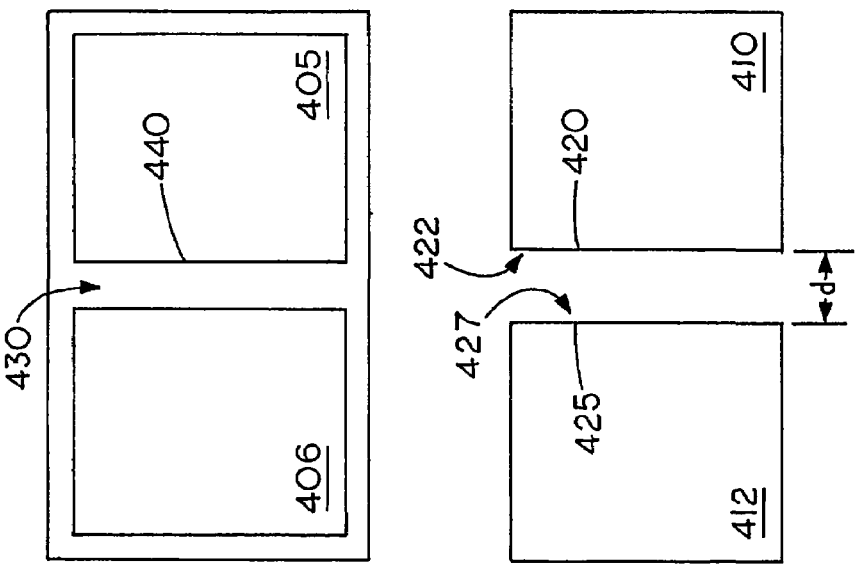

MAPPING SYSTEMS AND METHODS

BACKGROUND

The interior of a building is terra incognita to soldiers during urban combat. Blueprints of the building are rarely available, and currently the only way to generate a map of a building is for the soldier to draw a map by hand. This process has two major drawbacks. First, the act of drawing a map is a heads-down, two-handed operation, so that the soldier cannot maintain a ready attitude in the event of hostile activity. Second, the resultant map is crude and is often only just a dimensionally inaccurate representation of the interior of the building. As such, analysis of the hand-drawn map is limited, and the map is difficult to share with others. Too often, the knowledge gained by the first team of soldiers to enter a building is completely unavailable to the next group to enter.

For Urban Unattended ground Sensors (U-UGS) when one deploys sensors in a building, the physical layout of the building interior (i.e. the building "blueprint') is unknown. Thus, there is no good way of knowing the location of where in the building the sensors were deployed, or their context (for example, the area around each of those sensors). When an alarm goes off, sensors in an un-mapped building provide little additional information than a trip-wire system. Security personnel responding to the alarm would not know how to respond to a specific alarm from a specific sensor, because they would not know what room the sensor is in, and how that room relates to other rooms in the building (e.g., what room connect to that room), or whether that room is an interior room or has access from the building exterior via a window or door.

Current solutions for personal navigation are not well suited for mapping buildings. For example, global positioning system (GPS) solutions fail to work reliably inside of buildings because such solutions require a clear line of sight to three or four satellites to achieve the needed resolutions. Inside a building, reliable signals from these satellites are not available.

For the reasons stated above and for other reasons stated below which will become apparent to those skilled in the art upon reading and understanding the specification, there is a need in the art for improved systems and methods for mapping of a building interior.

SUMMARY

The Embodiments of the present invention provide methods and systems for accurate building mapping and will be understood by reading and studying the following specification.

In one embodiment, a system for mapping is provided. The system comprises a rangefinder adapted to output range measurements, an inertial sensor adapted to capture inertial measurements including inertial forces acting on the rangefinder and the attitude of the rangefinder, a processor coupled the rangefinder and the inertial sensor and adapted to receive a set of range measurements from the rangefinder and inertial measurements from the inertial sensor, and wherein the processor is adapted to produce a virtual room reconstruction based on the set of range measurements from the rangefinder and inertial measurements from inertial sensor.

In another embodiment, a method for mapping is provided. The method comprises orienting a mapping unit towards one or more target surfaces, collecting range measurements from the one or more target surfaces with the mapping unit, collecting inertial motion data representing the motion of the mapping unit while collecting the range measurements, and calculating room dimensions to produce a virtual room reconstruction based on the range measurements and the inertial motion data.

In yet another embodiment, a system for mapping is provided. The system comprises means for measuring ranges to one or more interior surfaces, means for measuring inertial motion representing the motion of the means for measuring ranges responsive to the means for measuring ranges, and means for calculating room dimensions to produce a virtual room reconstruction based on measurements from the means for measuring ranges and the means for measuring inertial motion data, the means for calculating responsive to the means for measuring ranges and the means for measuring inertial motion.

In still another embodiment, a computer-readable medium having computer-executable instructions for mapping is provided. The method comprises collecting range measurements of one or more target surfaces, wherein the range measurements are measured with a rangefinder, receiving inertial motion data representing the motion of the rangefinder while measuring the range measurements, and calculating room dimensions to produce a virtual room reconstruction based on the range measurements and the inertial motion data.

DRAWINGS

Embodiments of the present invention can be more easily understood and further advantages and uses thereof more readily apparent, when considered in view of the description of the embodiments and the following figures in which:

FIG. 3 is a diagram illustrating a virtual room reconstruction of one embodiment of the present invention;

FIGS. 4A and 4B are diagrams illustrating the assembly of a building map from virtual room reconstructions of one embodiment of the present invention;

In accordance with common practice, the various described features are not drawn to scale but are drawn to emphasize features relevant to the present invention. Reference characters denote like elements throughout figures and text.

DETAILED DESCRIPTION

Figure 1A:
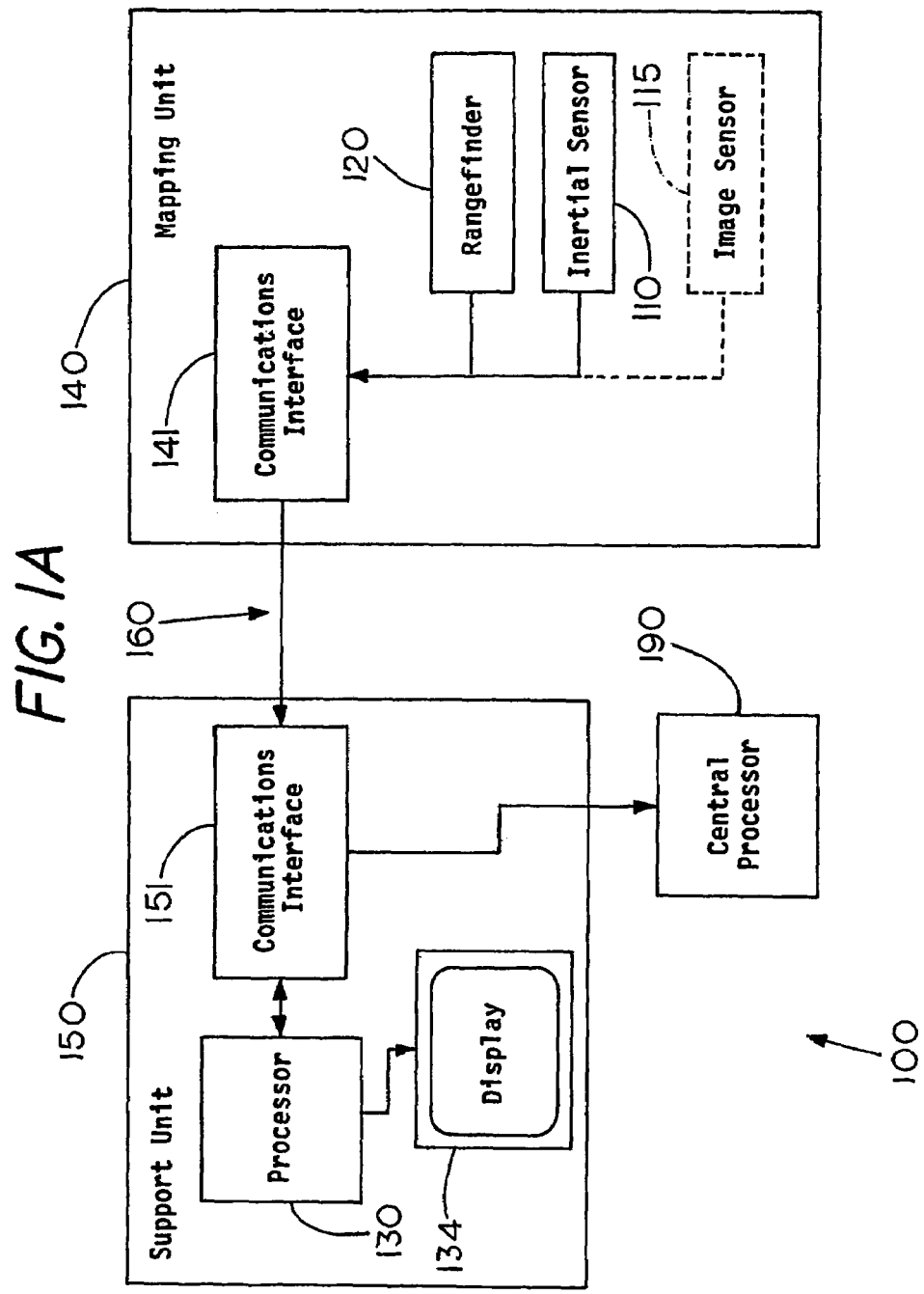
FIGS. 1A and 1B are diagrams of a building mapping system of one embodiment of the present invention.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention solve the problem of obtaining an accurate building map by enabling a soldier to generate the map while walking through the building. Using general properties of a building, described in this specification, combined with information obtained from embodiments of the present invention carried by the soldier, enables developing an accurate building map.

The importance of generating an accurate building map is two-fold. One of the difficulties in clearing a building is to make sure that all rooms and volumes have been explored. False walls and secret rooms pose a threat, and not just to those clearing the building. Having an accurate map of the building ensures that no such hidden volumes remain undiscovered or unexplored. Additionally, as new sensor systems such as the FCS Urban Unattended Ground Sensors become available for the interior of the building, the importance of having an accurate building map grows. Without a map, such systems serve as little more than trip-wires indicating that the whole building is compromised. When a map is available, the location of each sensor is known, enabling security personnel to respond appropriately to an alarm based on the location of the tripped sensor and the specific characteristics of the sensor location within the building. With a map, a sensor system can assess the threat level of a sensor alarm (for example, to alert a patrol in the street below of a possible sniper if the room with the tripped sensor has a view of the street). Thus with a map, it is possible to develop plans to neutralize a threat. Further, digitizing the map and making the map available on a network ensures that the knowledge gained by the first team of soldiers to enter a building is available to every group who must later enter the building.

In one embodiment of the present invention, a soldier maps a building in a repeating two-step process. In the first step, the soldier uses a range-finder to sweep the walls of the room, measuring the distance to one or more walls. At the same time, information about the attitude and position of the range-finder is obtained from a six-axis inertial sensor attached to the range-finder. This quick sweep takes only seconds, as the soldier need only trace a single line around the walls of the room with the rangefinder. In one embodiment, where the range-finder is attached or incorporated into a soldier's rifle, the soldier can accomplish the sweep in a heads-up fashion, while having ready access to a weapon at all times.

FIG. 1A illustrates a building mapping system 100 of one embodiment of the present invention. In the embodiment described in FIG. 1A, system 100 comprises an inertial sensor 110, a rangefinder 120, and a processor 130. In one implementation of system 100, inertial sensor 110 is a MEMS-based inertial navigation unit. In one embodiment, the rangefinder 120 may comprise one of, but not limited to, a laser rangefinder, a sonic rangefinder, or other range finding technology. Because inertial sensor 110 measures the inertial movements of rangefinder 120, inertial sensor 110 and rangefinder 120 must be physically coupled together to form a single mapping unit 140. In one embodiment, inertial sensor 110 and rangefinder 120 are both located within a housing carried by the soldier. In one embodiment, mapping unit 140 is a hand-held device, similar in size and shape to a flashlight. In another embodiment, a mapping unit 140 is mounted to a soldier's rifle, or other piece of equipment carried by the soldier. In one embodiment, processor 130 (and any additional support equipment as discussed below) is housed in a device on the soldier's person (illustrated by support unit 150) separately from mapping unit 140, to reduce the weight of what a soldier must carry by hand.

In one embodiment, mapping unit 140 and support unit 150 further comprise communications interfaces 141 and 151, respectively, which function to establish a communications link 160 between mapping unit 140 and support unit 150. Communications interface 141 receives data collected by inertial sensor 110 and rangefinder 120 and formats that data for transmission via communications link 160. Communications interface 151 receives the data from communications link 160 and forwards the data to processor 130. In one embodiment, communications link 160 is implemented by a physical means such as a wire or optical medium. In one embodiment, communications link 160 provides a wireless communications link between mapping unit 140 and support unit 150.

Figure 1B:
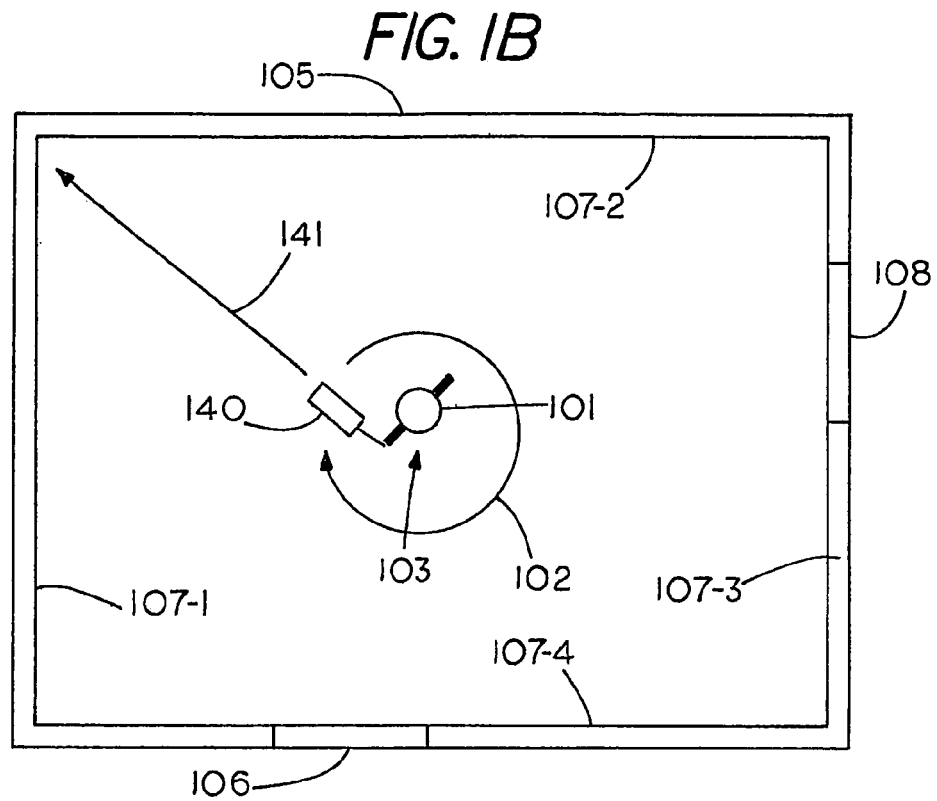

As illustrated in FIG. 1B, in one embodiment, in operation, a soldier (illustrated at 101) walks into a room 105 and establishes a position that defines the origin (shown generally at 103) of the room 105. As the soldier sweeps the room 105 (illustrated generally by the arrow at 102) with mapping unit 140, changes in the angle the soldier is pointing rangefinder 120 are captured and recorded by inertial sensor 110 while the distances to walls 107-1 to 107-4 are captured by rangefinder 120 and recorded. In one implementation of mapping unit 140, a range-finding beam (illustrated by 141) of rangefinder 120 is activated by one or both of a button and voice commands and remains on while the soldier measures continuously the perimeter of room 105, and then is deactivated by the soldier. Because, in one implementation of system 100, mapping unit 140 is operated by a human, it is reasonable to assume that rangefinder 120 is taking range measurements off of the walls of a room, and not off of other objects in the room, such as bookcases or curtains.

In operation, inertial sensor 110 records x-axis, y-axis, and z-axis accelerations experienced by mapping unit 140 as a soldier moves mapping unit 140, as well as the attitude (that is, the roll, pitch and yaw) of mapping unit 140. Thus, changes in direction in which rangefinder 120 is pointed are approximately known. Upon entering room 105, the soldier uses mapping unit 140 to sweep range-finding beam 141 from rangefinder 120 around the room, obtaining multiple measurements of the distances to the walls 107-1 to 107-4. Mapping unit 140 measures 1) the distance to the walls, 2) changes in direction in which the range-finding beam of rangefinder 120 is pointing, and 3) accelerations that rangefinder 120 undergoes. From these measurements (and assumptions that rangefinder 120 is measuring the distance to a wall and not other objects, and that the walls are vertical planes) processor 130 determines the dimensions of room 105 as described below.

Using the data collected by mapping unit 140, processor 130 reconstructs the room measurements. One aspect that makes this an easier task is the knowledge that walls are planar surfaces, which allows considerable simplification in the geometries that need to be considered. This assumption makes the subsequent analysis easier, and simplifies the data collection substantially. In the embodiment of system 100, processor 130 assumes that one of the two dimensions defining a wall's plane is known by assuming that walls in the room are vertical with respect to the floor of the room. Therefore, mapping unit 140 need only gather enough information to specify the length of the wall and its orientation with respect to the other walls of the room. The sweep of the range-finding beam with mapping unit 140 across a wall (which is essentially a one-dimensional curve) collects sufficient information to define the wall. To further simplify calculations, processor 130 further assumes that measurement data collected represents measurements of a wall and not measurements of clutter such as furniture, and the like. This assumption is valid as the problem of differentiating between walls and furniture is trivial for the human soldier pointing mapping unit 140. The soldier can easily trace a curve with mapping unit 140 on the walls of the room, avoiding the furniture and other clutter.

Figure 2:
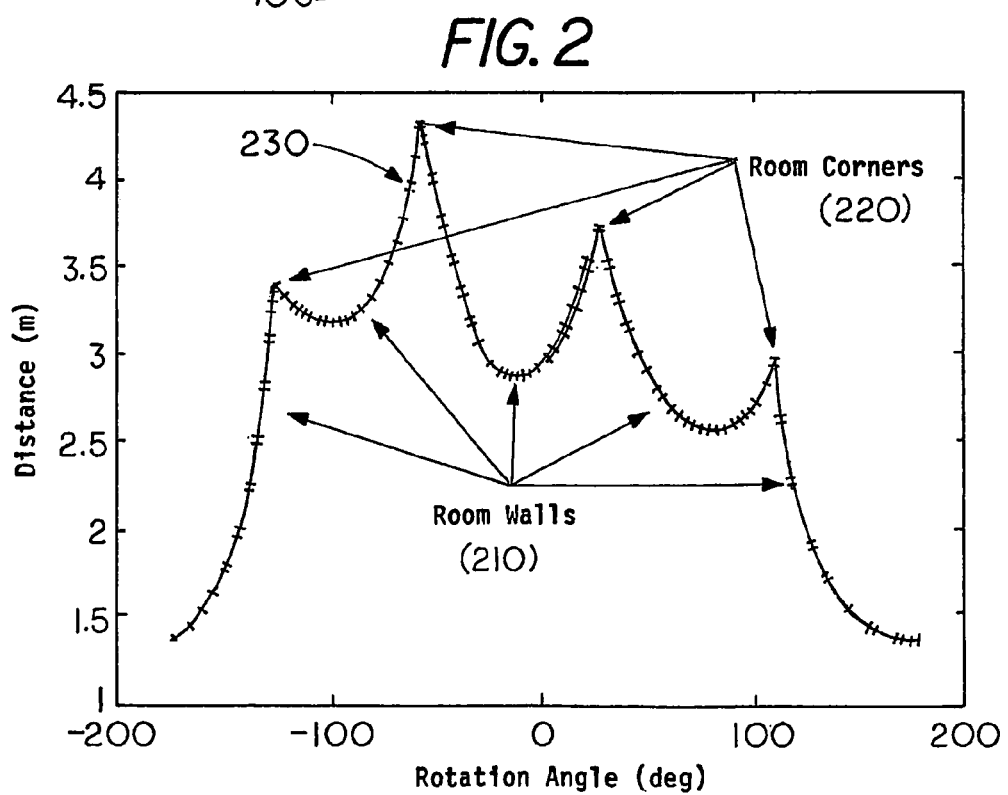
FIG. 2 is a graph illustrating measurement data captured by a building mapping system of one embodiment of the present invention.

Using this assumption of the simple geometric properties of walls, in one implementation, processor 130 splits the process of obtaining the room dimensions into two steps. In the first step, processor 130 uses measurement data to identify walls and corners and their associated distances from the soldier. A graphic illustration of an example of this measurement data is provided in FIG. 2. In the second step, the actual path of motion taken by mapping unit 140 (as measured by inertial sensor 110) and the room dimensions are obtained. From the rangefinder 120 measurements and inertial sensor 110 measurements, processor 130 evaluates the measured distance to the walls as a function of the relative angle through which mapping unit 140 was rotated, as illustrated in FIG. 2. Not only are individual room features such as walls (shown generally at 210) and corners (shown generally at 220) identified, but also each distance measurement data point obtained by rangefinder 120 (for example measurement data point 230) is associated with a correlating wall. This ability to establish a correspondence between a distance measurement and an individual wall is important, as it eliminates certain discontinuities that would otherwise occur in the error function discussed below.

In one embodiment, given the model of the walls illustrated in FIG. 2, and the association of distance measurements with the walls, processor 130 establishes room dimensions and the path taken by the mapping unit 140 that best fit the measurements, by minimizing the error function $$E = \sum_i \frac{(a_i - a'_i)^2}{\sigma_a^2} + \sum_j \frac{(\omega_j - \omega'_j)^2}{\sigma_\omega^2} + \sum_k \frac{(d_k - d'_k)^2}{\sigma_d^2} \quad (1)$$

Here, $a'_i$ is the model approximation for acceleration $a_i$ measured by the inertial sensor 110 (in its frame of reference), $\omega'_j$ is the model approximation for the output $\omega_j$ of a rate gyro within inertial sensor 110 (not shown), and $d'_k$ is the model approximation for the distance to the wall $d_k$ as measured by the laser range-finder.

Because processor 130 is able to correlate each distance measurement obtained by mapping unit 140 with an associated wall, the error function (1) has no discontinuities arising from the wall structure of a room. Further, because the trajectory of the mapping unit 140 is a physical trajectory, the error function (1) is continuous and differentiable. Hence, gradient-based methods of finding the minimization of error function (1) work well, and provide a suitable minimization in a short time (for example, in well less than the time it takes a soldier to travel from one room to the next).

would be appreciated by one skilled in the art upon reading this specification, once a best path is established and distance measurements are correlated with associated walls, the data collected by mapping unit 140 (which is based on a distance and angle coordinate scheme) is readily mapped into a rectangular coordinate system that describes room dimensions in terms of linear wall lengths, or any other coordinate system deemed useful for a particular application. FIG. 3 illustrates an example of one virtual room reconstruction 300 generated from the results of the minimization of error function (1) for measurement data obtained from a room having walls 310, 312, 314 and 316. An origin point 330 generally illustrates the point at which the soldier stood while sweeping the room with mapping unit 140. Scales 340 and 345 illustrate the relative linear dimensions of room reconstruction 300 features mapped onto a rectangular coordinate system. As illustrated by FIG. 3, the room reconstruction 300 provided by embodiments of the present invention are capable of not only obtaining the dimensions of walls 310, 312, 314 and 316 of a room 305, but also of the dimensions of the small protrusions such as 320-1 and 320-2 in two corners of room 305.

In one embodiment, mapping unit 140 is further enabled to collect measurement data pertaining to the locations of other important features of the room such as, but not limited to, doors (illustrated in FIG. 1B by 106) and windows (illustrated in FIG. 1B by 108). In one embodiment, when the soldier is finished sweeping the perimeter of the room, the soldier "decorates" the room with the locations of those important features. For example, in one embodiment, after defining the perimeter of the room 105, the soldier maps the existence of door 106 by turning towards door 106, turning on rangefinder 120, and drawing an "X" (or other arbitrary symbol) with the beam of rangefinder 120 where the door 106 exists. For example, in one embodiment, processor 130 incorporates measurement data for door 106 into room reconstruction 300 (illustrated in FIG. 3) by indicating the existence of door 335 on wall 310. As will be discussed in greater detail later in this specification, the existence and location of doors is important for establishing the interlinking of rooms for establishing a map of the building. In another embodiment, a soldier similarly maps a window by turning towards with window and drawing a circle "O" (or other arbitrary symbol) where the window 108 is. As would be appreciated by one skilled in the art upon reading this specification, other architectural features can be similarly mapped by defining their own unique symbols.

A map of a building is created by connecting room reconstructions for each room of a building measured by a mapping unit 140. In one embodiment, when data collection for a room is completed, processor 130 takes the data and reduces it into a room reconstruction for that room. As soldier goes from room to room, and each room's measurement data is reduced to a virtual room reconstruction, processor 130 takes the room reconstruction data, and using a combination of 1) knowledge of building constructs, 2) the path traveled by mapping unit 140 as a soldier moves from room to room, and 3) the location of doors connecting adjacent rooms, processor 130 puts together a map of the building.

In one embodiment, processor 130 builds the map of a building dynamically as the soldier walks through the building. In one embodiment, inertial sensor 110 remains on and measures movement data (even when the range-finding beam of rangefinder 120 is disabled) so that mapping unit 140 can determine how it travels from one room to another room. For example, if a soldier travels in the direction of a mapped wall, and inertial sensor 110 measures a change in distance greater than the previously measured distance to that wall, system 100 concludes that it has moved to another room. In one implementation processor 130 further uses previously measured features, such as doors, to correct errors in room measurements. For example, if the soldier travels in the direction of a mapped wall with a mapped door, and inertial sensor 110 measures a change in distance greater than the previously measured distance to that wall, the soldier must have walked through the door into the adjoining room. In this way, system 100 also keeps track of where a soldier has been within the building.

In some implementations, errors in measurement data are corrected by performing repetitive measurements of a room. For example, rooms and walls may be measured multiple times (either by the same soldier or other team members as discussed below) during passage through the building. In that case, processor 130 identifies repeat measurements by keeping track of a soldiers relative location within the building and when the soldier enters a room they have previously measured, processor 130 incorporates any additional measurement data collected for a wall with previous measurements for that wall and understand that the two measurement data sets of the single wall represent a single wall rather than two walls. In one implementation of system 100, processor 130 accounts for uncertainties in the measured dimensions of a room, by allowing room dimensions to vary along those degrees of freedom identified during the room measurement as having small eigenvalues.

A soldier exits one room immediately upon entering the next room. As the term "room" is used in this specification, any interior space or walled in exterior space in a building is a room. Therefore, hallways and closets, for example, are included as rooms, as are open-air areas such as courtyards. Further, each room connects directly to at least one other room. Upon entering a second room from a first room, the soldier proceeds to collect measurement data with mapping device 140 as described above with respect to FIGS. 1A and 1B for the second room. When the soldier has completed sweeping the second room, processor 130 creates a virtual room reconstruction for the second room as described above.

As the soldier proceeds from room to room within the building and collects room measurement data, processor 130 creates a virtual room reconstruction for each room. Processor 130 begins the task of constraining the inertial sensor 110 data collected while the soldier moved from the first room to the second room to bring room reconstructions together into a building map in a coherent manner. In one embodiment, support unit 150 further comprises a video display unit 134 that displays the current map of the building as currently assembled by processor 130.

In one implementation, processor 130 integrates over time the inertial sensor 110 data collected between room measurements. Because the time between room measurements will typically be short, integration of the inertial sensor 110 data measurements produces results with small enough measurement errors (e.g., due to noise) to allow for correction during the map-building phase. Errors can further be reduced by placing additional constraints on the data collected during the measurement of walls within a room. For example, in one embodiment the velocity of mapping unit 140 is constrained, for example, by not accepting room measurement data from mapping unit 140 captured when mapping unit 140 is traveling above certain velocities. Constraining the velocity of mapping unit 140 also serves to limit inertial sensor 110 error between sets of room measurements.

Using the inertial sensor 110 data collected while the soldier moves from the first room to the second room and contextual reasoning (such as the fact that each interior wall of a room has two faces which are parallel, about ten centimeters apart, and facing in opposite directions, and the fact that walls typically, but not always, meet at a 90° angle), processor 130 constructs a map of the building. In one embodiment, each room reconstruction is aligned by processor 130 by connecting mapped doorways and the track that mapping unit 140 travel through the building.

To assemble the virtual room reconstructions into a coherent and consistent building map, processor 130 weighs the measured room dimensions, with the knowledge of building construction discussed above. The process is similar to that of computer assembly of a jigsaw puzzle, but with several important differences. First, processor 130 knows the approximate location and orientation of the current room's virtual room reconstruction with respect to the last-measured room's virtual room reconstruction, based on the inertial sensor 110 measurement data taken during the inter-room travel. The inertial sensor 110 measurement data provide the relative orientation of the room with reasonable accuracy, but with a greater uncertainty in the position. Second, the shapes of the room reconstructions are not fixed as with jigsaw puzzle pieces, but rather have some degrees of freedom associated with uncertainties in the room measurement data. Third, unlike jigsaw puzzles, processor 130 must make assumptions pertaining to unknown spaces and dimensions that cannot be measured, such as hidden rooms within the building and the interior of walls.

In one embodiment, processor 130 makes assumptions when orienting and positioning virtual room reconstructions for the assembly of the building map based on structure limitations of physical walls in a building. For example, physical walls separate one room from another or from the building exterior, and have a nominal thickness depending upon the method of construction. The thickness of room walls is not directly measured with the mapping unit 140. Rather, only the surfaces of the walls are measured. Hence, after the room measurements are taken, we only know the position of the surfaces of the physical walls in the room. This specification refers to these measured surfaces as "virtual walls" to distinguish them from the physical walls.

FIG. 4A illustrates the relationship of virtual walls of virtual room reconstructions (shown at 410 and 412) and physical walls of physical rooms (shown at 405 and 406). Because virtual walls are oriented planes, processor 130 defines the interior face of the wall as facing into the room, and defines the exterior face of the virtual wall as facing out of the room. An exterior face 422 of a virtual wall 420 of virtual room reconstruction 410 "looks" into the interior 430 of a physical wall 440 it represents. Interior 430 of physical wall 440 is hidden from the view of a soldier operating mapping unit 140 in room 405. In order to bring a mathematical basis to resolve this problem, processor 130 minimizes an energy function (discussed below) that causes virtual walls to assume the same attributes and limitations as physical walls are expected to have. For example, for virtual wall 420 of virtual room reconstruction 410, an energy function for that wall is minimized when a virtual wall 425 from a second virtual room reconstruction 412 is parallel to it and has an exterior face 427 at a distance (d) equal to the nominal physical wall thickness expected for physical wall 440. In other words, minimization of the energy function establishes that the two virtual walls 420 and 425 define the two sides of a single physical wall 440 of adjoining rooms 405 and 406.

One of ordinary skill in the art would appreciate upon reading this specification that a number of ways are available for establishing the energy function discussed above with respect to FIG. 4A. For example, one way to obtain such an energy function is to utilize two "forces" to generate it. In one embodiment, a first force is an attractive force between two oppositely oriented virtual walls (such as virtual walls 420 and 425), that is dependent on the distance between the walls (e.g., varying as a function of $1/d^2$). In one embodiment, the second force is a very short range (e.g., varying as a function of $1/d^{12}$) repelling force between the volumes of the interior of the rooms. The attractive force will tend to pull virtual walls 420 and 425 together to form a representation of physical wall 440, while the repelling force will prevent two virtual walls from ever overlapping in an unphysical way (e.g., such as with the volumes of the two rooms interpenetrating). The two forces would reach an equilibrium point in such a way that the two walls would have a minimum energy configuration when the virtual walls 420 and 425 were parallel and separated by a distance d equal to the nominal thickness of physical wall 440.

The location of doorways between adjoining rooms provide further boundary constraints for aligning rooms as illustrated in FIG. 4B. In FIG. 4B, a physical door 407 is located between physical room 405 and 406. In one embodiment, using similar force and energy terms as described above, processor 130 aligns virtual room reconstructions 410 and 412 by aligning respective virtual door locations 460 and 462 (e.g. as marked by an "X" during a room sweep), within virtual walls 420 and 425 based on one of, or a combination of, the relative location of door locations 460 and 462, an assumed nominal standard doorway width (e.g. 3 feet), and on an assumption that a path 465 taken by the soldier in room to room transit (as measured by inertial sensor 110) passes through doors 460 and 462 and not walls 420 and 425. An energy function of this type thus also imposes those constraints that arise from properties of buildings.

Figure 5:
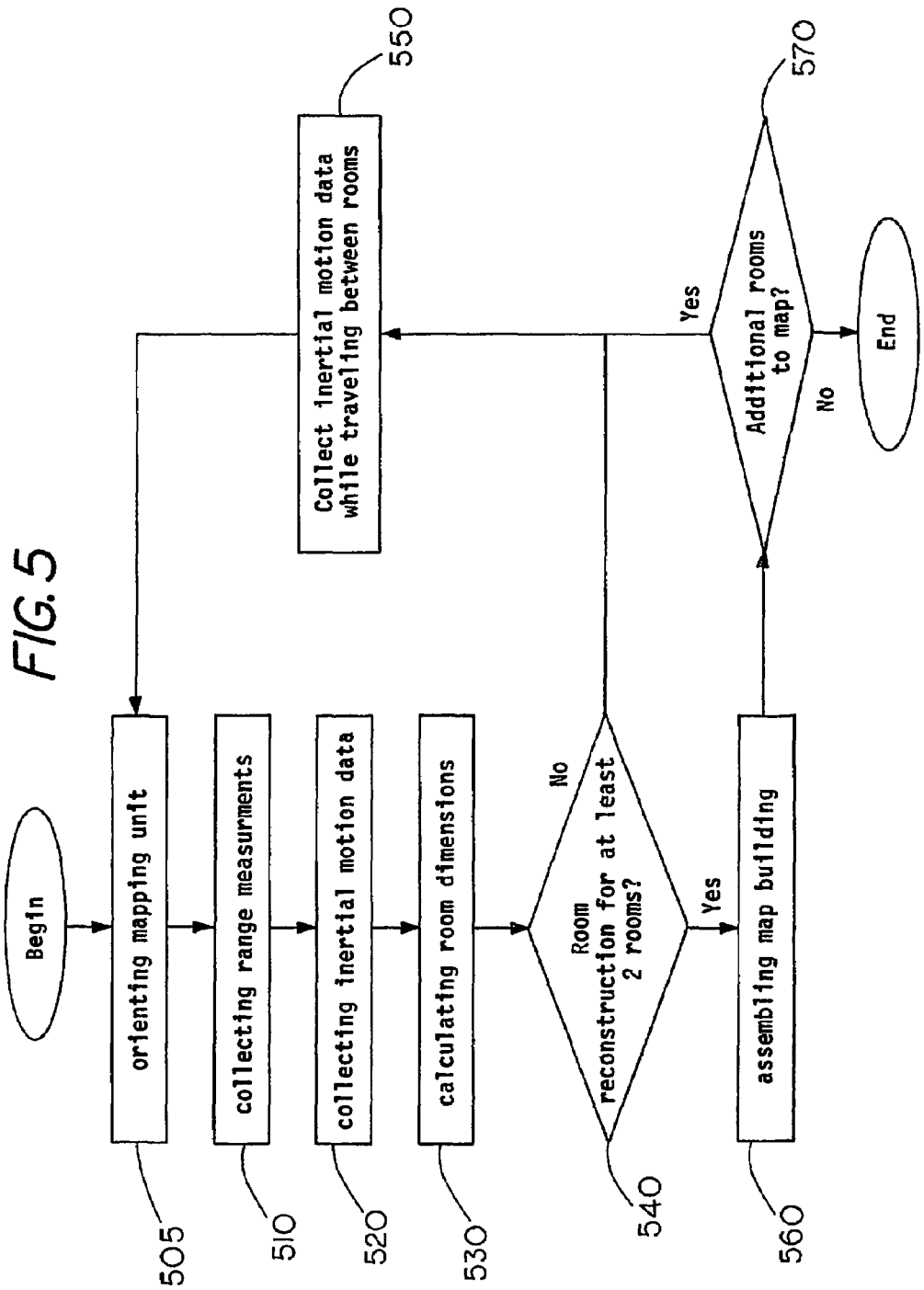
FIG. 5 is a flow chart illustrating a method of one embodiment of the present invention.

FIG. 5 is a flow chart illustrating a method for mapping a building interior of one embodiment of the present invention. The method begins at 505 with orienting a mapping unit towards one or more target surfaces, such as the interior walls of a room. The method proceeds to 510 with collecting range measurements from the target surfaces by rotating a mapping unit around the room. In one implementation, range measurements are collected by the mapping unit by using a rangefinder such as, but not limited to, a laser-rangefinder, a sonic-rangefinder or other range-finding device. At 520, the method further comprises collecting inertial motion data representing the motion of the mapping unit while collecting the range measurements. The inertial motion data includes x-axis, y-axis, and z-axis accelerations experienced by the mapping unit as well as the attitude (that is, the roll, pitch and yaw) of the mapping unit 140 as the mapping unit is used to collect the range measurements. Thus, changes in direction in which the rangefinder is pointed while collecting range measurements is known. In one embodiment, the mapping unit is mounted on a soldier's rifle and obtains the range and inertial motion data as the soldier points the rifle at surfaces within the room. The method then proceeds to 530 with calculating room dimensions to produce a virtual room reconstruction based on the measured distance to walls of the room as a function of the relative angles through which the mapping unit was rotated. Calculating room dimensions includes one or both of associating distance measurements with individual walls and minimizing an error function to produce a virtual wall representing a surface of each of one or more physical wall of the room measured. When a virtual room reconstruction has not been produced for at least two rooms (checked at 540), the method continues to 550 with collecting inertial motion data while traveling to a next room and then returns to 510 in order to collect range and motion data at 510 and 520 respectively, and produce a virtual room reconstruction of the next room at 530. When a virtual room reconstruction has been produced for at least two room, the method continues to 560 with assembling a map of the building based on the two or more virtual room reconstructions and the inertial motion data collected while traveling from room to room. If additional rooms remain to be mapped (checked at 570) then the method continues to 550 with collecting inertial motion data while traveling to the next room, and then returns to 505 in order to orient the mapping unit, collect range and motion data at 510 and 520 respectively, and produce a virtual room reconstruction of the next room at 530.

In one embodiment, assembling a map of the building at 560 includes weighing measured room dimensions of the virtual room reconstructions with knowledge of building construction. In one embodiment, assembling a map of the building includes minimizing an energy function that causes virtual walls to assume the same attributes and limitations as physical walls are expected to have as described with respect to FIGS. 4A and 4B above.

In one embodiment, the method optionally comprises collecting measurement data pertaining to the location of one or more other important features of the room such as, but not limited to, doors and windows. In that case, calculating room dimensions further includes produce a virtual room reconstruction based on the measured locations of the important features. For example, in one embodiment, a soldier identifies the location of a door by turning towards the door, turning on the rangefinder, and drawing an "X" (or other arbitrary symbol) with the beam of rangefinder where the door exists. The location of the door within the virtual room reconstruction is then established based on the inertial data captured while drawing the X and the range measurement data collected while drawing the X. As would be appreciated by one skilled in the art upon reading this specification, other architectural features can be similarly mapped by defining their own unique symbols.

Although the above embodiments have been described in terms of a single soldier mapping a building, embodiments of the present invention using a team of two or more soldiers taking measurements within a building are contemplated. Team members can either start at the same origin within a building and spread out to map rooms independently, or start at two or more different locations within the building that have a known relative distances from each other. In one alternate embodiment of building mapping system 100, to facilitate team map-building, system 100 further comprises a communications interface 132 for establishing a wireless communications link to share data with one or more other building mapping systems (not shown). In one embodiment, data for producing virtual room reconstructions collected by a mapping unit 140 is shared with the building mapping systems carried by other team members over the wireless communications link. In one such embodiment, the processor within each team members building mapping system assembles a building map based on data collected by its own mapping unit and the shared data received from other team members via the communications link. In another embodiment, data collected by each team member is wirelessly transmitted from communications interface 132 to a central processor 190 for assembling a single building map based on the data collected by the plurality of team members. In another embodiment, system 100 optionally comprises a camera 115 and captures images while room measurements are obtained. In one embodiment, the images are also transmitted to the central processor 190 to aid in enhancing the assembled building map. For example, in one embodiment, room images are evaluated and used to correct door and window sizing and placement within a room's virtual room reconstruction.

Also, although the above embodiments illustrate military applications of the present invention, any non-military application for where obtaining accurate building maps are advantageous are also contemplated. For example, in alternate embodiment, a professional such as, but not limited to, a real estate agent, a building engineer, or an interior designer uses an implementation of system 100 for obtaining a blueprint of a building.

Several means are available to implement the embodiments discussed above. These means include, but are not limited to, digital computer systems, programmable controllers, or field programmable gate arrays. Therefore other embodiments of the present invention are program instructions resident on computer readable media which when implemented by such processors, enable the processors to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for mapping, the method comprising:
   orienting a mapping unit towards one or more target surfaces;
   collecting range measurements from the one or more target surfaces with the mapping unit;
   collecting inertial motion data representing the motion of the mapping unit while collecting the range measurements; and
   calculating room dimensions to produce a virtual room reconstruction based on the range measurements and the inertial motion data;
   wherein collecting inertial motion data further comprises collecting accelerations experienced by the mapping unit and attitude measurements of the mapping unit as the mapping unit collects the range measurements.

2. The method of claim 1, wherein calculating room dimensions further comprises associating range measurements with one or more virtual walls.

3. The method of claim 1, wherein calculating room dimensions further comprises minimizing an error function to produce one or more virtual walls representing the one or more target surfaces.

4. A method for mapping, the method comprising:
   orienting a mapping unit towards one or more target surfaces;
   collecting range measurements from the one or more target surfaces with the mapping unit;
   collecting inertial motion data representing the motion of the mapping unit while collecting the range measurements;
   calculating room dimensions to produce a virtual room reconstruction based on the range measurements and the inertial motion data;
   moving the mapping unit from a first room to a second room;
   collecting inertial motion data while moving from the first room to the second room; and
   assembling a map based on two or more virtual room reconstructions and the inertial motion data collected while moving from the first room to the second room.

5. The method of claim 4, wherein assembling a map of the building farther comprises reaching an equilibrium between a first force and a second force, wherein the first force is an attractive force between a first virtual wall of a first virtual room reconstruction and a second virtual wall of a second virtual room reconstruction, and the second force is a repelling force between the first virtual wall of the first virtual room reconstruction and the second virtual wall of the second virtual room reconstruction.

6. A system for mapping, the system comprising:
   means for measuring ranges to one or more interior surfaces;
   means for measuring inertial motion representing the motion of the means for measuring ranges responsive to the means for measuring ranges; and
   means for calculating room dimensions to produce a virtual room reconstruction based on measurements from the means for measuring ranges and the means for measuring inertial motion data, the means for calculating responsive to the means for measuring ranges and the means for measuring inertial motion;
   wherein the means for calculating is further adapted to assemble a map by minimizing at least one energy function based on physical constraints that arise from properties of buildings.

7. The system of claim 6, wherein the means for calculating is adapted to produce a virtual room reconstruction incorporating one or more room features based on a set of measurements from the means for measuring ranges and the means for measuring inertial motion data.

8. The system of claim 6, wherein the room features include at least one of a door and a window.

9. The system of claim 6, wherein the means for calculating is adapted to assemble a map based on establishing the relative position of two or more virtual room reconstructions.

10. A system for mapping, the system comprising:
    means for measuring ranges to one or more interior surfaces;
    means for measuring inertial motion representing the motion of the means for measuring ranges responsive to the means for measuring ranges; and
    means for calculating room dimensions to produce a virtual room reconstruction based on measurements from the means for measuring ranges and the means for measuring inertial motion data, the means for calculating responsive to the means for measuring ranges and the means for measuring inertial motion;
    wherein the means for calculating is further adapted to assemble a map based on reaching an equilibrium between a first force and a second force, wherein the first force is an attractive force between a first virtual wall of a first virtual room reconstruction and a second virtual wall of a second virtual room reconstruction, and the second force is a repelling force between the first virtual wall of the first virtual room reconstruction and the second virtual wall of the second virtual room reconstruction.

11. A computer-readable medium having computer-executable instructions for mapping, the method comprising:
collecting range measurements of one or more target surfaces, wherein the range measurements are measured with a rangefinder;
receiving inertial motion data representing the motion of the rangefinder while measuring the range measurements;
calculating room dimensions to produce a virtual room reconstruction based on the range measurements and the inertial motion data;
collecting inertial motion data representing movement of the rangefinder from a first room to a second room; and
assembling a map based on two or more virtual room reconstructions.

12. The computer-readable medium of claim 11, wherein calculating room dimensions further comprises associating range measurements with one or more virtual walls.

* * * * *